(12) United States Patent
Titley

(10) Patent No.: US 10,366,190 B2
(45) Date of Patent: *Jul. 30, 2019

(54) SAFETY FEATURES FOR HIGH LEVEL DESIGN

(71) Applicant: ALTERA CORPORATION, San Jose, CA (US)

(72) Inventor: Adam Titley, Bracknell (GB)

(73) Assignee: ALTERA CORPORATION, San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/940,881

(22) Filed: Mar. 29, 2018

(65) Prior Publication Data

US 2018/0218094 A1    Aug. 2, 2018

Related U.S. Application Data

(63) Continuation of application No. 15/633,461, filed on Jun. 26, 2017, now Pat. No. 10,007,748, which is a continuation of application No. 14/930,407, filed on Nov. 2, 2015, now Pat. No. 9,690,894.

(51) Int. Cl.
*G06F 17/50* (2006.01)

(52) U.S. Cl.
CPC ........ *G06F 17/505* (2013.01); *G06F 17/5054* (2013.01); *G06F 17/5045* (2013.01)

(58) Field of Classification Search
CPC .......................... G06F 17/505; G06F 17/5054
See application file for complete search history.

(56) References Cited

U.S. PATENT DOCUMENTS

| | | | | |
|---|---|---|---|---|
| 6,625,797 B1* | 9/2003 | Edwards | ................ | G06F 8/447 702/108 |
| 6,732,354 B2* | 5/2004 | Ebeling | .................... | G06F 8/31 717/114 |
| 6,851,108 B1* | 2/2005 | Syme | .................. | G06F 9/44589 717/118 |
| 6,964,029 B2* | 11/2005 | Poznanovic | ........ | G06F 17/5045 716/105 |

(Continued)

OTHER PUBLICATIONS

Lattner, Chris, "Introduction to the LLVM Complier System", llvm.org Architect, ACAT '08, Nov. 4, 2008, 55 pages.

(Continued)

*Primary Examiner* — Naum Levin
(74) *Attorney, Agent, or Firm* — Fletcher Yoder, P.C.

(57) ABSTRACT

This disclosure relates generally to electronic design automation using high level synthesis techniques to generate circuit designs that include safety features. The algorithmic description representation can be specified in a first language and include at least one programming language construct associated with a first safety data type. Compiling the algorithmic description may involve identifying the at least one construct, accessing a first safety data type definition associated with the first safety data type, and generating a second representation of the circuit design based on the algorithmic description representation and the first safety data type definition. The second representation can be provided in a second language and include at least one safety feature for a portion of the circuit design associated with the at least one construct.

20 Claims, 8 Drawing Sheets

(56) References Cited

U.S. PATENT DOCUMENTS

| | | | | |
|---|---|---|---|---|
| 7,020,716 | B2* | 3/2006 | Raval | H04L 43/50 370/249 |
| 7,299,458 | B2* | 11/2007 | Hammes | G06F 8/447 716/103 |
| 7,350,165 | B2* | 3/2008 | Miyachi | G06F 8/423 716/103 |
| 7,565,631 | B1* | 7/2009 | Banerjee | G06F 17/5045 716/103 |
| 7,805,690 | B2* | 9/2010 | Willis | G01R 31/318364 716/103 |
| 7,840,777 | B2* | 11/2010 | Mykland | G06F 9/3001 712/15 |
| 7,904,194 | B2* | 3/2011 | Brown | G05B 19/408 700/174 |
| 7,912,990 | B2* | 3/2011 | Schlette | G06F 11/0796 710/10 |
| 7,941,239 | B2* | 5/2011 | Ikegami | G05B 19/058 700/11 |
| 8,091,053 | B2* | 1/2012 | Aoyama | G06F 17/505 716/108 |
| 8,234,604 | B2* | 7/2012 | El-Zein | G06F 17/505 716/100 |
| 8,315,721 | B2* | 11/2012 | Horn | G05B 19/0423 700/86 |
| 8,381,173 | B2* | 2/2013 | Yuan | G05B 19/056 717/104 |
| 8,433,831 | B2* | 4/2013 | Ost | G05B 19/056 326/37 |
| 8,718,064 | B2* | 5/2014 | Beliveau | H04L 67/327 370/392 |
| 8,813,013 | B2* | 8/2014 | Titley | G06F 17/5054 716/117 |
| 8,959,469 | B2* | 2/2015 | Chen | G06F 17/5054 716/101 |
| 9,081,928 | B2* | 7/2015 | Van Eijndhoven | G06F 8/456 |
| 9,111,060 | B2* | 8/2015 | Titley | G06F 17/5054 |
| 9,195,575 | B2* | 11/2015 | Kaku | G06F 9/461 |
| 9,218,443 | B1* | 12/2015 | Styles | G06F 8/451 |
| 9,329,844 | B2* | 5/2016 | Lattner | G06F 8/41 |
| 9,652,213 | B2* | 5/2017 | MacCleery | G06F 8/60 |
| 9,690,894 | B1* | 6/2017 | Titley | G06F 17/5072 |
| 2002/0133788 | A1* | 9/2002 | Waters | G06F 8/44 716/103 |
| 2002/0199173 | A1* | 12/2002 | Bowen | G06F 11/362 717/129 |
| 2003/0200538 | A1* | 10/2003 | Ebeling | G06F 8/31 717/160 |
| 2010/0229151 | A1* | 9/2010 | Yuan | G05B 19/056 717/104 |
| 2012/0144376 | A1* | 6/2012 | Van Eijndhoven | G06F 8/456 717/146 |
| 2013/0144589 | A1* | 6/2013 | Levi | G06F 17/5022 703/14 |
| 2013/0212365 | A1* | 8/2013 | Chen | G06F 17/5054 713/1 |
| 2013/0332937 | A1* | 12/2013 | Gaster | G06F 9/50 718/104 |
| 2014/0325462 | A1* | 10/2014 | Titley | G06F 17/5054 716/105 |
| 2015/0088286 | A1* | 3/2015 | Ruth | G05B 19/0426 700/86 |

OTHER PUBLICATIONS

Altera SDK for OpenCL, Best Pratices Guide, 80 pages.
Altera SDK for OpenCL, Programming Guide, 114 pages.
Clubb, Stuart, Catapult C® Synthesis, High Level Synthesis Webinar, Mentor Graphics, Apr. 2009, 12 pages.
Los Alamos National Laboratory, "Float Compiler Reference Manual", 8 pages.
Khronos Group, "The OpenCL Specification", Khronos OpenCL Working Group, Version 1, revised Oct. 6, 2009, 308 pages.
Ferrandi et al., Politecnico di Milano, "Generating gates from C: a test with PPSi,", Oct. 6-7, 2014, 22 pages.
Pilato, et al., "Bambu: A Free Framework for the High-Level Synthesis of Complex Applications", 1 page.
Altera SDK for OpenCL Version 15.1 Release Notes, Nov. 2, 2015, 11 pages.
Rotem, Nadav, "C-to-Verilog.com: High-Level Synthesis Using LLVM", University of Haifa, 35 pages.
Altera, Nios®II, Nios II C2H Compiler, User Guide, Version 9.1, Nov. 2009, 138 pages.

* cited by examiner

SAFETY FEATURES FOR HIGH LEVEL DESIGN

This is a continuation of U.S. patent application Ser. No. 15/633,461 filed Jun. 26, 2017, entitled "SAFETY FEATURES FOR HIGH LEVEL DESIGN," which is a continuation of U.S. Pat. No. 9,690,894, filed Nov. 2, 2015, entitled "SAFETY FEATURES FOR HIGH LEVEL DESIGN," the entirety of both are herein incorporated by reference for all purposes.

TECHNICAL FIELD

This disclosure relates generally to electronic design automation, and more specifically, to electronic design automation using high level synthesis techniques to generate circuit designs that include safety features.

DESCRIPTION OF RELATED TECHNOLOGY

Adding safety features to particular portions of a circuit design can be desirable, for example, to reduce the risk of error or failure when the resultant device is deployed. For example, particular applications using such devices, such as automotive, avionics, aerospace, aeronautical, industrial machinery and military applications, may require or especially benefit from increased safety considerations and protections. Indeed, some applications explicitly require particular safety features. But design flows in which circuit designers directly specify such safety features, measures or protection mechanisms using high level synthesis languages may be undesirable, prone to error, ineffective, insufficient, inefficient or too costly in terms of time or monetary expense.

SUMMARY

The systems, devices, methods and processes described in this disclosure each have several innovative aspects, no single one of which is solely responsible for the desirable attributes disclosed herein.

One innovative aspect of the subject matter described in this disclosure can be implemented in tangible computer-readable media storing non-transitory code executable by one or more processors. The code can be configured to, when executed by the one or more processors, cause operations to be performed including accessing an algorithmic description representation of a circuit design. The algorithmic description representation can be specified in a first language and include at least one programming language construct associated with a first safety data type. The operations also can include compiling the algorithmic description representation of the circuit design. In some implementations, the compiling includes identifying the at least one construct, accessing a first safety data type definition associated with the first safety data type, and generating a second representation of the circuit design based on the algorithmic description representation and the first safety data type definition. The second representation can be provided in a second language and include at least one safety feature for a portion of the circuit design associated with the at least one construct.

In some implementations, the algorithmic description representation is a control-flow-based representation. In some implementations, the first language is a high level synthesis (HLS) programming language. For example, the first language can be an OpenCL-compatible programming language. In some implementations, the second representation of the circuit design is a data-flow-based representation. In some such implementations, the second representation of the circuit design is a register-transfer level (RTL) representation. For example, the second language can be a hardware description language (HDL).

In some implementations, the algorithmic description representation includes one or more directives identifying one or more header files, the one or more header files defining one or more safety data types including the first safety data type. In some such implementations, the compiling further includes: identifying the one or more directives, identifying the one or more header files, accessing the one or more header files, retrieving the contents of the one or more header files, and including the contents of the one or more header files in the algorithmic description representation prior to generating the second representation.

In some implementations, the at least one construct includes at least one variable defined using the first safety data type. In some implementations, the at least one construct includes at least one function having a return type defined using the first safety data type. In some implementations, the at least one construct includes at least one function including at least one parameter defined using the first safety data type. In some implementations, the at least one construct includes at least one pragma directive identifying a function as a safety-critical function.

Another innovative aspect of the subject matter described in this disclosure can be implemented in a system including one or more memory devices storing non-transitory processor-executable code configured to implement instructions. The system includes one or more processing devices to execute the processor-executable code to implement the instructions. The instructions are configured to cause operations to be performed including accessing an algorithmic description representation of a circuit design. The algorithmic description representation can be specified in a first language and include at least one programming language construct associated with a first safety data type. The operations can further include compiling the algorithmic description representation of the circuit design. The compiling can include identifying the at least one construct, accessing a first safety data type definition associated with the first safety data type, and generating a second representation of the circuit design based on the algorithmic description representation and the first safety data type definition. The second representation can be provided in a second language and include at least one safety feature for a portion of the circuit design associated with the at least one construct.

In some implementations, the algorithmic description representation is a control-flow-based representation. In some implementations, the second representation of the circuit design is a data-flow-based representation. In some implementations, the algorithmic description representation includes one or more directives identifying one or more header files, the one or more header files defining one or more safety data types including the first safety data type. In some implementations, the compiling further includes identifying the one or more directives, identifying the one or more header files, accessing the one or more header files, retrieving the contents of the one or more header files, and including the contents of the one or more header files in the algorithmic description representation prior to generating the second representation.

In some implementations, the at least one construct includes at least one variable defined using the first safety data type. In some implementations, the at least one construct includes at least one function having a return type defined using the first safety data type. In some implementations, the at least one construct includes at least one function including at least one parameter defined using the first safety data type. In some implementations, the at least one construct includes at least one pragma directive identifying a function as a safety-critical function.

Another innovative aspect of the subject matter described in this disclosure can be implemented in a method including accessing, by a computer system, an algorithmic description representation of a circuit design. The algorithmic description representation can be specified in a first language and include at least one programming language construct associated with a first safety data type. The method also includes compiling, by the computer system, the algorithmic description representation of the circuit design. The compiling can include identifying the at least one construct, accessing a first safety data type definition associated with the first safety data type, and generating a second representation of the circuit design based on the algorithmic description representation and the first safety data type definition. The second representation can be provided in a second language and include at least one safety feature for a portion of the circuit design associated with the at least one construct.

In some implementations, the algorithmic description representation is a control-flow-based representation. In some implementations, the second representation of the circuit design is a data-flow-based representation.

Details of one or more implementations of the subject matter described in this disclosure are set forth in the accompanying drawings and the description below. Other features, aspects, and advantages will apparent to persons having ordinary skill in the art from the description, the drawings and the claims.

BRIEF DESCRIPTION OF THE DRAWINGS

These and other aspects are described further below with reference to the drawings. Like reference numbers and designations in the various drawings indicate like elements. Note that the relative dimensions of the elements of the drawings may not be drawn to scale.

DETAILED DESCRIPTION OF EXAMPLE IMPLEMENTATIONS

Figure 1:
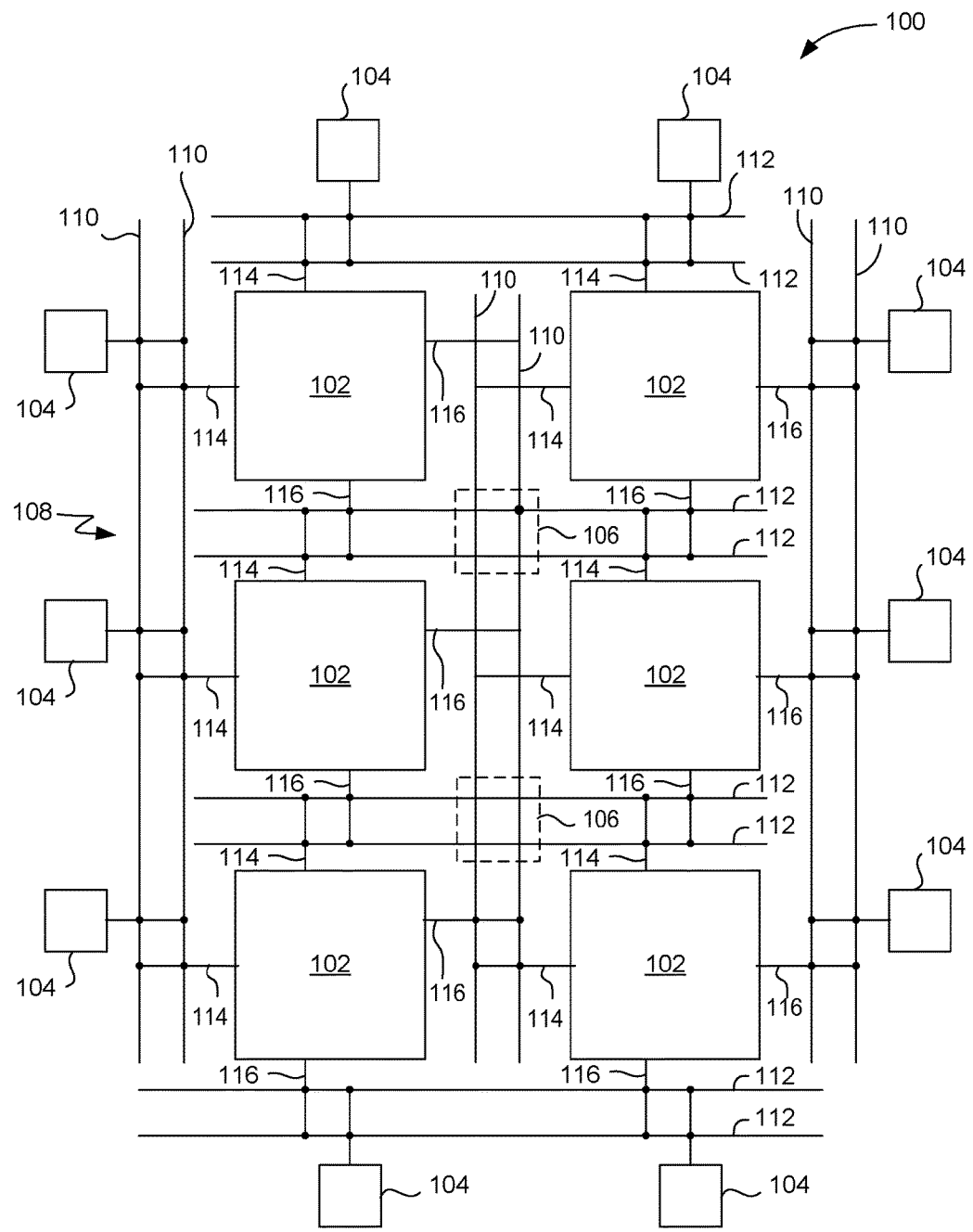
FIG. 1 shows an example schematic diagram of an FPGA architecture.

In the following description, numerous specific details are set forth in order to provide a thorough understanding of the presented implementations. The disclosed implementations may be practiced without some or all of these specific details. While the disclosed implementations will be described in conjunction with the specific implementations described and shown, the disclosed implementations are not limited to the specific implementations. In some instances, well-known process operations have not been described in detail to not unnecessarily obscure the disclosed implementations. Additionally, in some implementations, the disclosed processes may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; for example, the phrase "A, B or C" is intended to include the possibilities of "A," "B," "C," "A and B," "B and C," "A and C" and "A, B and C."

Various implementations relate generally to systems, devices, programs and methods enabling high level synthesis of a design project such as a circuit design. In one aspect, some implementations more specifically relate to a high level synthesis software program (also referred to herein as a "tool") that enables a programmer, designer, developer or user (all of which may be used interchangeably herein) to specify, construct or otherwise input or provide a circuit design at a high level of abstraction. In some implementations, the high level representation (or "description") of the circuit design is specified in the form of an algorithmic or behavioral description of the circuit to be implemented. For example, a programmer can specify the high level representation of the circuit design using a high level programming language. The high level synthesis tool is further configured to compile the high level representation of the circuit design to generate an intermediate level representation of the circuit design. In some implementations, the intermediate level representation can then be integrated with other portions of a grander, top-level design at an intermediate level of abstraction. In some implementations, the high level synthesis tool is additionally configured to generate a low level representation of the circuit design based on the intermediate level representation.

In particular implementations, the high level synthesis tool enables a programmer designing a high level representation of a circuit design to specify, declare, mark, flag, identify or otherwise indicate that particular parameters, functions, memory addresses or other programming language constructs are to be given special attention when compiled. In some implementations, a programmer can specify that particular parameters (for example, variables) are special by declaring, instantiating or otherwise defining such parameters using special data types. In some implementations, a programmer also can specify that particular functions are special by declaring such functions using special return types, or by defining such special functions using parameters that are themselves defined using special data types. For example, a programmer can specify that particular parameters or functions are safety-critical parameters or functions with the use of specialized safety versions of data types, referred to hereinafter as "safety data types." In some implementations, the high level synthesis tool compiles the parameters or functions specified as safety-critical differently than their non-safety-critical counterparts would be compiled. For example, parameters and functions specified as safety-critical can be compiled to include additional safety features, measures or protection mechanisms (collectively referred to hereinafter as "safety features") in the intermediate level representation, or can otherwise be compiled with special considerations not taken when compiling other portions of the design.

In some implementations, the high level synthesis tool also can compile the intermediate level representation including the safety features into a low level representation including safety logic for implementing the safety features. In some implementations, the low level representation can be compiled to generate configuration settings in the form of programming bits for implementing the circuit design in a programmable logic device (PLD), such as a field-programmable gate array (FPGA). Additionally or alternatively, the low level representation can be compiled or otherwise converted to generate a physical design layout for implementing the circuit design in an application-specific integrated circuit (ASIC) or other fixed logic device.

Adding safety features to particular portions of a circuit design can be desirable, for example, to reduce the risk of error or failure when the resultant device is deployed. For example, particular applications using such devices, such as automotive, avionics, aerospace, aeronautical, industrial machinery and military applications, may require or especially benefit from increased safety considerations and protections. Indeed, some applications explicitly require particular safety features. But design flows in which circuit designers directly specify such safety features, measures or protection mechanisms using high level synthesis languages may be undesirable, prone to error, ineffective, insufficient, inefficient or too costly in terms of time or monetary expense.

In some implementations, the high level synthesis tools disclosed herein (as well as other tools described herein) can be used in the construction of circuit designs particularly suited for implementation in programmable logic (also referred to herein as "configurable" or "reconfigurable" logic). For example, such circuit designs can be programmed into PLDs such as FPGAs or complex PLDs (CPLDs). Additionally or alternatively, the high level synthesis tools disclosed herein (as well as other tools described herein) can be used in the creation of circuit designs particularly suited for implementation in non-configurable "fixed" or "hardwired" logic. For example, such circuit designs can be masked, patterned, deposited, grown or otherwise fixed in a non-configurable form in a semiconductor (for example, silicon) integrated circuit die. Examples of such latter devices include application-specific integrated circuits (ASICs), application-specific standard products (ASSPs), application-specific instruction set processors (ASIPs) or general purpose central processing units (CPUs) among other examples. Additionally or alternatively, the high level synthesis tools disclosed herein (as well as other tools described herein) can be used in the creation of circuit designs suitable for implementation in either configurable logic or non-configurable hardware logic, or a combination of configurable and non-configurable logic.

FPGAs and CPLDs are PLDs designed to be configured for use after the physical device is manufactured. One example of a CPLD is the MAX II CPLD produced by Altera Corporation of San Jose, Calif. Some examples of FPGAs, including partially-reconfigurable FPGAs and System-on-Chip (SoC) FPGAs, include the MAX 10 FPGA, Arria 10 FPGA SoC, Cyclone V FPGA SoC, and Stratix 10 FPGA SoC produced by Altera Corporation. Broadly, FPGAs include programmable logic blocks and reconfigurable interconnects that allow the programmable logic blocks to be interconnected in different configurations. FIG. 1 shows an example schematic diagram of an FPGA architecture 100. The FPGA architecture 100 includes an array of configurable logic blocks (CLBs) 102, also referred to as logic array blocks (LABs), as well as configurable input/output (I/O) pads 104, switches 106, and a routing architecture or "fabric" 108. For example, the routing architecture 108 can include multiple vertically-oriented lines or channels 110 and multiple horizontal lines or channels 112 that connect the logic blocks 102 and I/O pads 104. Each logic block 102 generally includes one or more inputs 114 and one or more outputs 116. Individual logic blocks 102 and combinations of logic blocks can be configured to perform as simple logic gates (for example, AND gates, NAND gates, OR gates, NOR gates, and XOR gates, among others), to perform as logic circuits (for example, multiplexers and arithmetic logic units (ALUs), among others), to perform complex combinational functions, to perform as memory elements (for example, latches, flip-flops, and registers, or even entire blocks of memory), to perform as memory controllers, as well as to perform as microprocessors, processor cores or microcontrollers. Although six logic blocks 102 are shown for purposes of explanation in FIG. 1, an FPGA can generally include hundreds, thousands, or even millions of logic blocks 102 arranged in a logic block array and interconnected by the routing architecture 108. Various implementations described in this disclosure are not limited to any particular type of FPGA or FPGA hardware layout (for example, the layout of the logic blocks, routing architecture, and I/O pads).

Figure 2:
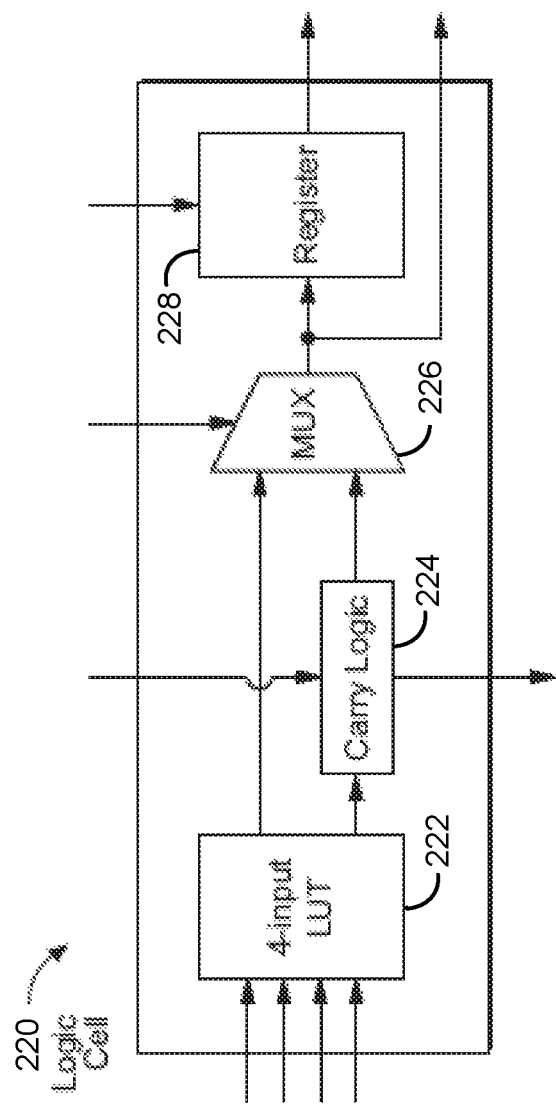
FIG. 2 shows an example schematic diagram of a logic cell.

A typical FPGA logic block 102 includes one or more logic cells, also referred to as logic elements (LEs). FIG. 2 shows an example schematic diagram of a logic cell 220. In some implementations, each logic cell 220 includes a look-up table (LUT) 222. In the illustrated example, each logic cell 220 more specifically includes a 4-input LUT 222. In some other FPGA devices, each logic cell 220 can include a 6-input LUT or a LUT having another number of inputs (for example, some LUTs include 7 or more inputs). In some implementations, each LUT 222 is actually implemented as two or more lower input LUTs. For example, a 4-input LUT can be implemented as two interconnected 3-input LUTs.

Figure 3:
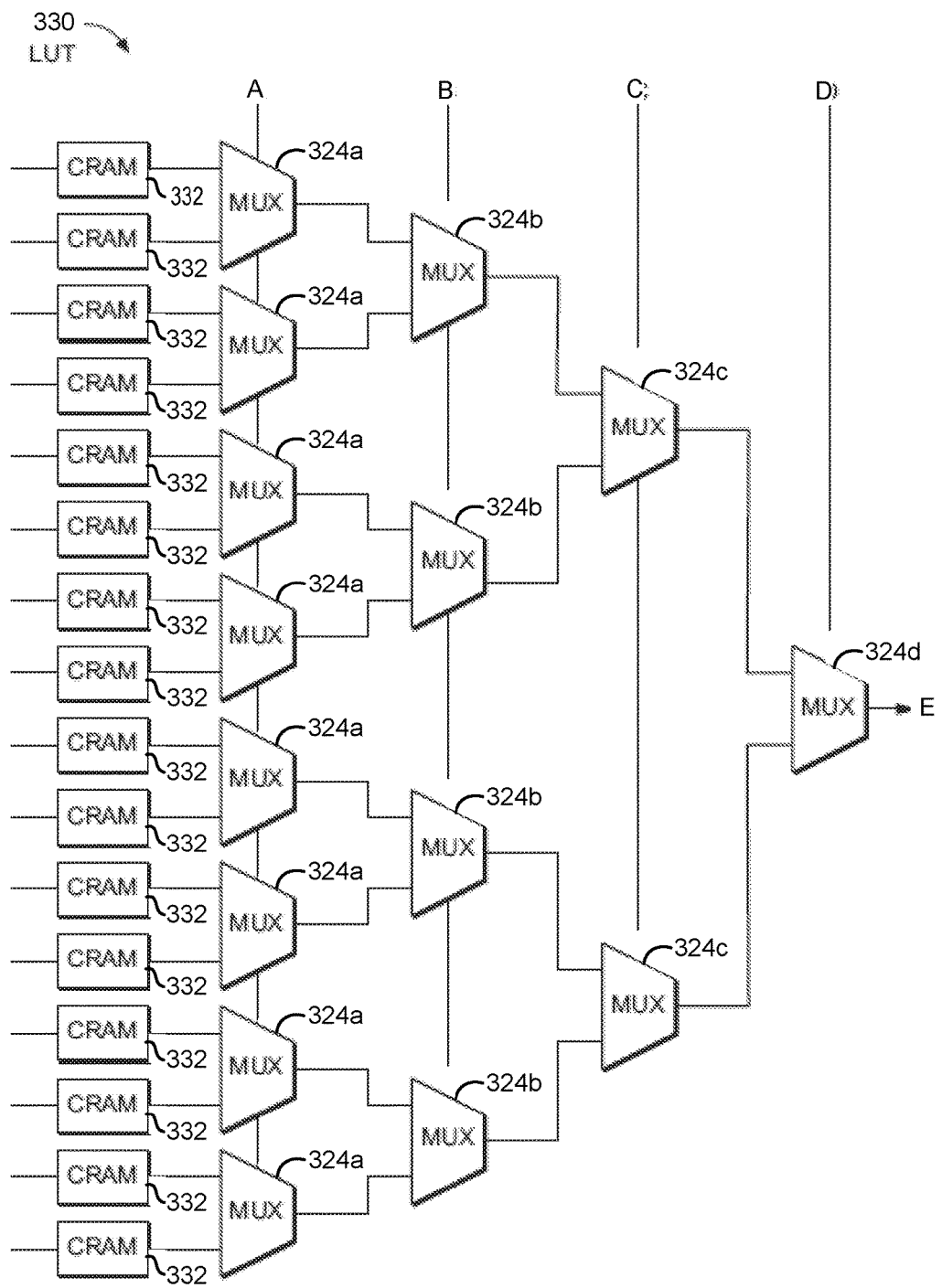
FIG. 3 shows an example 4-input LUT.

Many FPGAs are based on static random-access memory (SRAM). Typically, $2^n$ SRAM cells and corresponding bits are used to implement an n-input LUT-a LUT that maps "n" inputs or input functions to a single output. Thus, to implement a 4-input LUT, sixteen SRAM programming bits can typically be required. The SRAM cells are often referred to as the configuration RAMs or "CRAMS." The programming bits used to configure the FPGA are programmed into the CRAMs (for example, on power-up or during partial reconfiguration) to implement the circuit design. In some implementations, each LUT 222 can be implemented as a $2^n$:1 multiplexer (or "MUX") where each CRAM provides the input to a corresponding input of the multiplexer. In some such implementations, a $2^n$:1 multiplexer can be implemented as $2^n-1$ individual 2:1 multiplexers. FIG. 3 shows an example 4-input LUT 330. The 4-input LUT 330 includes 16 CRAMs 332 each providing an input to a 2:1 multiplexer of a first stage of multiplexers 324a. The outputs of the first stage of multiplexers 324a are the inputs to a second stage of multiplexers 324b. The outputs of the second stage of multiplexers 324b are the inputs to a third stage of multiplexers 324c. Finally, the outputs of the third stage of multiplexers 324c are the inputs to the fourth stage multiplexer 324d, which has a single output E. Each of the multiplexers of a given stage of multiplexers is controlled by a corresponding one of the inputs to the LUT 222. For example, the first stage multiplexers 324*a* are controlled by the first input A, the second stage multiplexers 324*b* are controlled by the second input B, the third stage multiplexers 324*c* are controlled by the third input C, and the fourth stage multiplexer 324*d* is controlled by the fourth input D. Based on the input signals A, B, C, and D, the set of multiplexers selects a bit to drive the output E. The bits in the CRAMs 332 dictate which logical operation or function is to be performed by the LUT 222. Each LUT 222 can generally implement any logical operation that can be specified with the number of inputs to the LUT. Thus, an n-input LUT can generally implement any logical function that can be specified with n or fewer binary inputs. Other CRAMs control or dictate the configuration of the switches 106 and the routing architecture 108 including the routing between logic blocks 102 and the routing between various other inputs and outputs (including between logic cells 220) and between the logic blocks 102 and the I/O pads 104.

Referring back to FIG. 2, each logic cell 220 also can include one or more other elements such as, for example, carry logic 224 (for example, a full adder (FA)), a multiplexer 226, and a register 228 (for example, a flip-flop such as a D flip-flop). The register 228 may receive a clock signal from a global clock tree (not shown) of the FPGA. The register may receive the output signal E of the LUT 222 and output the signal E based on the clock signal. In some implementations, the FPGA can include different types of logic cells 220. For example, various logic cells 220 can include LUTs 222 having various different numbers of inputs. Other logic cells 220 also can include other non-configurable hardwired components such as multiplexers, demultiplexers, and registers.

In some implementations, the FPGA also can include fixed, embedded components including, for example, high speed I/O logic, multipliers, memory arrays and digital signal processing (DSP) blocks (constructed on the silicon (Si) die itself). For example, some FPGAs include integrated flash memory arrays to store configuration settings enabling "instant on" functionality. Some FPGAs also are configured as System on Chip (SoC) devices. For example, some FPGA SoCs produced by Altera Corporation include an integrated hard processor system (HPS). For example, the Stratix® 10 FPGA provided by Altera Corporation includes an assortment of embedded components including an HPS, a transceiver, DSP blocks, external memory interfaces, embedded flash memory, embedded DDR3 SDRAM, high speed I/O logic. Other FPGA SoCs also can include additional processing units such as one or more CPLDs, other FPGAs, or fixed processing units for implementing embedded microcontrollers, graphic processing units (GPUs), digital signal processors (DSPs), or one or more hardware accelerators (for parallel processing/computing). For example, some SoCs can include a host processor as well as one or more FPGA accelerators. Such an arrangement is an example of a high-performance reconfigurable computing (HPRC) architecture.

In some instances, the host processor can be a CPU or multi-core microprocessor. The ARM® Cortex®-M1 32-bit reduced instruction set computing (RISC) processor is an example of such a host processor suitable for use in some instances. The ARM processor can be provided as a gate level netlist or as a synthesizable register transfer level (RTL) representation to a chipmaker, which then fixes the design permanently in silicon as a hard core processor. Alternatively, the ARM M1 processor core can be optimized as a soft core processor to be programmed into a hosting FPGA device within the SoC. The Nios II processor (provided by Altera Corporation) is another example of a suitable host processor in some instances. Like the ARM® Cortex®-M1 processor, the Nios II processor is a 32-bit processor designed for embedded applications and particularly for FPGAs.

The initial programming, configuring or configuration of a PLD (such as an FPGA or CPLD), as well as the reprogramming, reconfiguring or reconfiguration of the PLD, can be accomplished using a download cable. The download cable functions similarly to a router in that it receives configuration settings in a programming file from a computer system via a first communication protocol (for example, the USB or Ethernet Protocol), converts (or "transforms" or "translates") the configuration settings for communication in a second communication protocol (for example, the JTAG protocol), and transmits the configuration settings to the PLD (or a configuration device as described below) via the second communication protocol. For example, the conversion from the first communication protocol to the second communication protocol can include unpackaging the configuration data communicated via the first communication protocol and repackaging the configuration data for communication via the second communication protocol. Some examples of some currently available download cables include the ByteBlaster II download cable, which enables a computer to transfer the configuration data of a programming file to a PLD using a standard parallel printer port of the computer, the USB-Blaster download cable, which enables a computer to transfer the configuration data of a programming file to a PLD using a Universal Serial Bus (USB) port of the computer, or the Ethernet-Blaster download cable, which enables a computer to transfer the configuration data of a programming file to a PLD using an Ethernet network port of the computer (all offered by Altera Corporation).

As described above, many FPGAs are static RAM (SRAM)-based. FPGAs are typically programmed (or "configured") by loading the configuration settings (in the form of "programming bits") into the SRAM cells. SRAM-based cells are volatile and thus the SRAM cells are programmed upon every power-up of the FPGA. That is, each time the FPGA is powered on, the programming bits must be retrieved from a memory device and loaded into the FPGA. Logic within the FPGA then programs the configuration settings into the appropriate SRAMs. In some instances, the download cable can couple the computer directly to the PLD. If the download cable is used to directly program the volatile memory (the SRAM cells) of an FPGA, the configuration data only remains programmed in the FPGA while the FPGA remains on (because the configuration data is stored in volatile memory, when the FPGA is powered off, the FPGA is no longer programmed with the configuration data).

In some other instances, an FPGA or other PLD can be programmed using an intermediate configuration device. The configuration device generally includes a memory controller and a non-volatile memory. The memory of the configuration device can include a flash memory array, for example, implemented with NAND or NOR logic gates. The memory controller in the configuration device can be or can include the Parallel Flash Loader (PFL) offered by Altera Corporation. The configuration device can be programmed with configuration settings via a download cable whether or not the configuration device is connected with a PLD or whether or not a connected PLD is powered on. Some examples of such configuration devices include the EPCS, EPCQ, and EPCQ-L configuration devices offered by Altera Corporation. In some instances, the configuration device can be mounted on the same board as the PLD. In such instances, when the PLD is powered on, the controller in the configuration device reads the configuration settings stored in the memory and loads the configuration settings into the PLD.

In some other instances in which the PLD is an FPGA SoC that includes a hardwired or embedded memory controller and an embedded non-volatile memory array (for example, a flash memory array), a configuration device is not necessary. In some such FPGA SoCs, the memory controller can be or can include the Parallel Flash Loader (PFL) produced by Altera Corporation. In such instances, a download cable can be used to transfer the configuration settings to the memory controller of the FPGA SoC, which then stores the configuration settings in the non-volatile memory array. As similarly described above, when the PLD is powered on, the controller reads the configuration settings stored in the non-volatile memory and loads the configuration settings into the PLD.

Many circuit developers have used hardware description languages to design digital logic descriptions and other aspects of digital circuits and systems. Generally, a hardware description language (HDL) is a computer specification language or modeling language that can be used to describe a circuit's operation, its design and organization, and tests to verify its operation by means of simulation. Examples of HDLs include Verilog (standardized in IEEE 1364), VHDL (VHSIC HDL), ABEL (Advanced Boolean Expression Language), and Altera HDL (AHDL) (a proprietary digital HDL from Altera Corporation of San Jose, Calif.). The level of abstraction implemented with HDL is generally characterized as the register-transfer-level (RTL). The RTL design abstraction models a circuit design as a synchronous digital circuit in terms of digital signals between, for example, hardware registers, as well as the logical operations performed on those signals by combinational logic. The use of HDL enables a circuit developer to specify the functionality of a circuit at a relatively high level without requiring the developer to specify a particular electronic technology platform and physical layout. Typically, a developer uses HDL to specify a data flow model of a circuit design with timing information. For example, a developer can specify a design using hard-coded logic such as HDL text-based expressions of the spatial and temporal structure and behavior of the circuit or system.

With the increased use and complexity of digital circuits, many circuit developers have turned to high level synthesis (HLS) (also referred to as C synthesis, electronic system-level (ESL) synthesis, algorithmic synthesis, or behavioral synthesis) tools to generate at least portions of circuit designs. For example, such HLS languages include C (for example, ANSI C versions including C99, C11 or other versions), C++, SystemC, SystemVerilog, Handel-C, LabVIEW FPGA from National Instruments Corp., CoreFire Design Suite from Annapolis Micro Systems, Inc., among others. Additionally, software developers skilled in high level languages such as C, C++ and other C-based languages or frameworks are increasingly developing circuit designs for use in PLDs such as FPGAs and FPGA SoCs. In particular, many developers have turned to the Open Computing Language (OpenCL™) standard framework as the use of heterogeneous system architectures and parallel computing have grown. OpenCL is especially well-suited for designing accelerating algorithms in heterogeneous systems. The OpenCL standard enables the use of a C-based programming language (for example, based on the ANSI C99 version) for developing circuit designs across different technology platforms such as FPGAs, CPLDs, ASICS, ASSPs, ASIPs, general purpose CPUs, GPUs and DSPs, among other examples. The OpenCL framework also includes an application program interface (API) enabling a host processor within an SoC to communicate with one or more hardware accelerators (for example, over a PCI Express® bus), or more generally, for one kernel executing within one accelerator to communicate with another kernel executing within the host processor or within another accelerator without host interaction.

Figure 4:
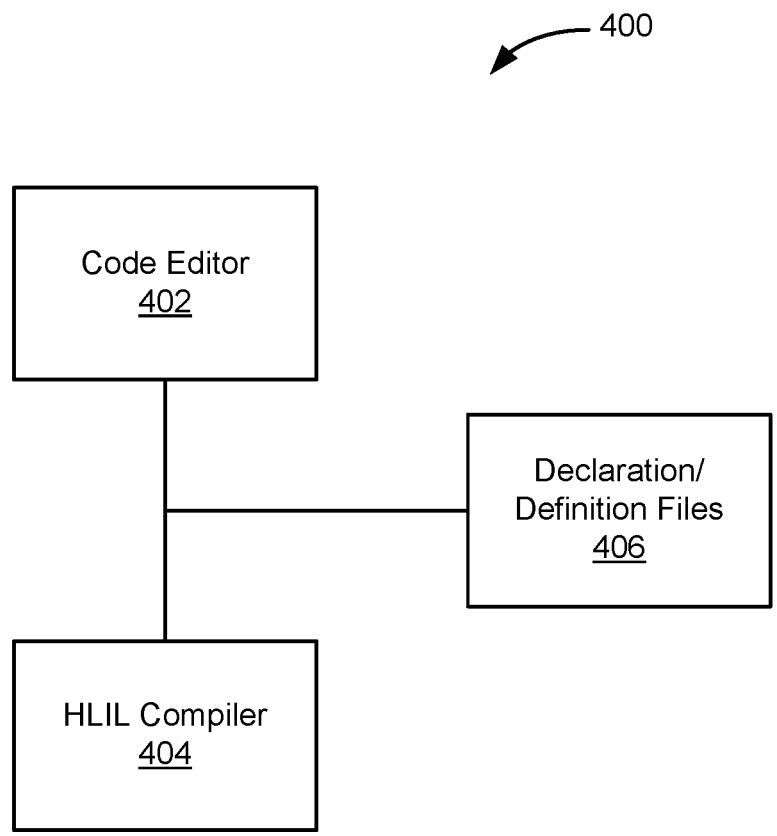
FIG. 4 shows a block diagram of an example high level synthesis tool (HLS) according to some implementations.

FIG. 4 shows a block diagram of an example high level synthesis tool (HLS) 400 according to some implementations. The HLS tool 400 includes a code editor 402, a high-level-to-intermediate-level (HLIL) compiler 404, and one or more declaration or definition files 406. The code editor 402 can be or can include any suitable text editor such as, for example, VIM, EMACS, NOTEPAD or NOTEPAD++, among others, as well as specialized versions of such editors or proprietary editors. The code editor 402 enables a programmer to create a high level description or representation of a circuit design in the form of high level source code. The code editor 402 enables the programmer to specify the source code using, for example, a graphical user interface (GUI) of the system in which the HLS tool 400 is executing. As described above, such source code can be written in a high level programming language such as an OpenCL-compatible language, SystemC, C, C++, or another C-based programming language or higher level or specialized version thereof. Some such HLS languages enable the programmer to generate a high level representation of a circuit design in the form of a control-flow-based algorithmic description. The source code for the circuit design can then be stored in a file within the system in which the HLS tool 400 is executing for subsequent use by the developer or by other developers having access.

For example, a circuit developer using the HLS tool 400 to complete all or a portion of a circuit design is not necessarily the same user as the developer who wrote the source code for a different portion of the circuit design (although they may be the same person or on the same team). For example, a developer can input and integrate his own circuit design with source code from another developer within the same enterprise, as well as source code from a third party developer or vendor. A user of the HLS tool 400 can input source code developed by another user into the system in which the HLS tool 400 is executing via a number of mechanisms, such as by way of downloading a file containing the source code through a wired or wireless network interface or by copying or transferring the source code file from an external memory device. As another example, the programmer of the source code can write some or all of the source code using a text editor in another computer system and then write other portions of the source code, debug the source code, or compile the source code on the system that includes the HLS tool 400.

The HLIL compiler 404 can be a single compiler or can collectively refer to a set or suite of compilers, one or more of which are configured to compile the high level representation in the form of the source code to an intermediate level representation. In some implementations, the intermediate level representation describes the circuit at the RTL level of abstraction. For example, the HLIL compiler 404 can compile the source code into HDL. In some specific implementations, the HLIL compiler 404 compiles source code specified in an OpenCL-compatible language, SystemC, C, C++, or another C-based programming language into an intermediate level representation specified in Verilog, VHDL or AHDL. For example, the HLIL compiler 404 can include functionality similar to other C-to-HDL (or C-to-RTL) compilers such as the C2H compiler provided in the Nios II Embedded Design Suite (EDS) or the Altera OpenCL SDK compiler (both provided by Altera Corporation).

In some implementations, the HLIL compiler 404 can additionally or alternatively be configured to compile source code specified in a first higher-level C-based language (for example, an OpenCL-compatible language or SystemC) into an intermediate level representation specified in a second lower-level C-based language (for example, C or C++). In some implementations, the HLIL compiler 404 can additionally or alternatively be configured to compile source code specified in a high level language into an intermediate representation specified in other intermediate representation languages or formats. For example, such other intermediate representation languages can include or be based on the LLVM intermediate representation (IR) or "intermediate form" (IF) (developed by the LLVM Developer Group).

The HLS tool 400 advantageously enables circuit developers to program designs for implementation on various technology platforms without having to understand or target particular technology platforms. For example, because intermediate level representations such as HDL or other RTL representations are generally agnostic to technology platforms, higher level synthesis languages that are compiled into such intermediate representations using the HLIL compiler 404 also are agnostic to technology platforms. The HLS tool 400 also advantageously enables circuit developers to program circuit designs without having the understanding of, or skill in using, traditional circuit design languages such as Verilog or VHDL (such as software designers). Additionally, whether or not such circuit developers are capable of, let alone proficient in, designing a circuit using a traditional specification or modeling language such as HDL, the circuit developers may prefer to specify their designs using high level synthesis languages. Such developers may prefer coding in high level synthesis languages for a number of reasons including, for example, to avoid having to understand, incorporate or perform timing analysis. This is because high level synthesis languages such as C-based programming languages generally do not include the notion of time. Rather, C-based programming languages are generally control-flow-based as opposed to HDL languages or other RTL abstraction languages that are generally data-flow-based.

As described above, adding safety features, measures or protection mechanisms to particular portions of a design can be desirable, for example, to reduce the risk of error or failure when the resultant device is deployed. For example, particular applications using such devices, such as automotive, aerospace, aeronautical, industrial or military applications, may require or especially benefit from increased safety features. For example, the RTCA DO-254/Eurocae ED-80 standard provides guidance for design assurance of airborne electronic hardware, and in particular, defines objectives that must be met by avionics equipment manufacturers according to EASA and FAA guidelines. But techniques in which a programmer of the source code directly specifies safety features using a high level synthesis language may be undesirable, prone to error, ineffective, insufficient, inefficient or too costly in terms of time or monetary expense. As an example, when safety features are specified in control-flow-based languages such as C-based programming languages, and subsequently compiled into HDL using traditional compilers, the generated HDL implementations of the safety features can in some instances be sloppy, misrepresented, error prone or inaccurate. In such instances, human intervention is generally desirable or necessary to clean-up or correct the HDL representations of the safety features. Additionally, in such instances involving human intervention, traceability between the safety features as coded in the source code and the safety features as implemented at the logic level or physical level is lost.

In some high level C-based programming languages, the programmer begins the source code by entering one or more directives. For example, the directives can include one or more preprocessor directives such as one or more "include directives." In C syntax, an include directive can be entered in a command line of the code editor 402 as:

include <file>

When the source code is compiled, each include directive causes or otherwise triggers the HLIL compiler 404 to replace the command line associated with the include directive with the contents of the associated declaration or definition file 406 that is identified by the filename (within the angle brackets) following the include directive. In many programming languages, such declaration or definition files 406 are referred to as header files or simply "headers" (all of which are hereinafter used interchangeably unless otherwise indicated). Typically, a source code project includes multiple directives for including multiple corresponding header files, each of which can itself include various predefined data types, functions or other constructs. Each programming language generally includes a standard library of numerous predefined data types, functions or other constructs that are grouped into a number of header files. Higher level synthesis languages can include header files found in other standard libraries, for example, other standard libraries associated with languages from which they are based. For example, the standard library for a C-based programming language can include the header files found in the C standard library as well as the header files found in the C++ standard library.

The header files 406 that form the standard library for the HLS tool 400 can include data type definitions, function prototypes, function definitions, macro definitions, global variables, and class definitions. Each one of the header files 406 can be stored with the HLIL compiler 404 in the system, stored at another location within the system in a directory created or selected by default by the HLS tool 400, or stored at another location defined by a programmer. Each data type defined in the header files 406 is a classification that can be associated with various parameters (variables). Each data type can generally determine the possible data values for the variables associated with that data type, the operations that can be done on variables of that data type, the meaning of the data identified by the variables, and how the data associated with the variables of that data type can be stored.

In C-based programming languages, data types are used to declare variables of different types. For example, such data types can include: char (smallest addressable unit), signed char, unsigned char, short, short int, signed short, signed short int, unsigned short, unsigned short int, int, signed, signed int, unsigned, unsigned int, logint, insideint long, long int, signed long, signed long int, unsigned long, unsigned long int, long long, long long int, signed long long, signed long long int, unsigned long long, unsigned long long int, float (referred to as a single-precision floating-point type), double (referred to as double-precision floating-point type), and long double (extended precision floating-point number format), among numerous others. For example, to declare and define a variable "a" of type int, the following code can be entered on a command line in the code editor 402:

int a;

This command line instructs the HLIL compiler 404 to create a variable "a," and to set aside storage for the data associated with the variable. The size of the storage and the properties of the variable are defined by the data type int, which definition is found in one of the header files 406.

A function can be declared using a function prototype. For example, to declare a function named "MyFunction" that returns a result (variable) of type float based on two parameters "a" and "b" (referred to as the arguments of the function), the following code can be entered on a command line in the code editor 402:

float MyFunction(a, b)

In the above example, it is assumed that the parameters a, an integer variable, and b, a floating point variable, have already been declared. Without first declaring the parameters a and b, the same function also can be declared as float MyFunction(int a, float b);

The function definition provides the body of the function. For example, the following code can be entered on a command line in the code editor 402 to define the function:

```
{
<statements>
return <expression of type return-type>;
}
```

As described above, predefined data types for variables can be specified, defined and stored in various ones of the header files 406. Predefined function prototypes and predefined function definitions for particular functions, such as regularly used functions, complex functions, custom functions, or any other desired functions, also can be previously specified, defined and stored in various ones of the header files 406. In this way, a programmer developing a circuit design using the HLS tool 400 need not redefine the data types, function prototypes and function definitions. Instead, the programmer can declare and define variables using the data types already defined in the header files 406, and declare and define new functions that call other functions already defined in the header files 406.

In various implementations, one or more of the header files 406 include definitions for various special data types and/or definitions or prototypes for various special functions. In some specific implementations, one or more of the header files 406 define various safety data types and safety functions. In some implementations, the safety data types include specialized safety versions of other data types, such as typical standard data types. For example, in some implementations, standard data types such as char, short, int, long, float and double can have safety version counterparts safe_char, safe_short, safe_int, safe_long, safe_float and safe_double. In some implementations, the safety data types are defined by the provider, producer or manufacturer (hereinafter "provider") of the HLS tool 400 in one or more safety-associated ones of the header files 406 included with the HLS tool 400.

In some such implementations, the safety data types are defined in the same language that a downstream circuit designer using the HLS tool 400 codes in (for example, the downstream circuit designer can be an employee of a buyer of the HLS tool 400 or an employee of a customer of the provider of the HLS tool 400). In some implementations, the provider of the HLS tool 400 can specify, define and store safety data types in header files 406 using existing C-based constructs such as "struct tag," "union tag," or "typedef." Additionally or alternatively, the safety data types can be specified or defined via other mechanisms. For example, templates also can be used to specify generic code that can generate safety versions of standard or other complex or custom data types. In implementations in which the HLS tool 400 enables a circuit designer to specify a circuit design in more than one high level language, the HLS tool 400 can include predefined safety data types and safety functions in each of multiple programming languages, whether such safety data types or safety functions are stored in header files 406 or in other suitable files or formats as appropriate. Additionally, because the intermediate level representation output from the HLIL compiler 404 can be agnostic to technology platforms, the same source code can be used to implement circuit designs across multiple technology platforms without adjustments.

The provider of the HLS tool 400 can define, specify, design or otherwise implement one or more safety features corresponding to the safety data types. In some implementations, the source code for the safety data types and safety functions has already been tested and optimized before its inclusion in the header files 406 by the provider of the HLS tool 400. For example, the source code included in the header files 406 for each of the safety data types and safety functions can previously be tested, validated or verified to ensure that it is compiled into an HDL or other intermediate representation that properly implements the corresponding safety features. To ensure that the HDL or other intermediate representation properly implements the corresponding safety features, the intermediate representation can itself also be previously tested, validated or verified to ensure that it is synthesized into a gate level netlist or other lower level representation that properly implements the corresponding safety features. In turn, to ensure that the gate level netlist or other lower level representation properly implements the corresponding safety features, the lower level representation can itself also be previously tested, validated or verified to ensure that it is generated into configuration settings, a physical design layout or generally a physical or low level representation that properly implements the corresponding safety features. In this way, when the HLIL compiler 404 compiles the source code for a later-developed circuit design that includes safety data types and safety functions in the header files 406, the intermediate representation output from the HLIL compiler 404 after compiling should include reliable intermediate level code for implementing the safety features later on in the design flow.

In some implementations, the safety-critical variables and safety-critical functions are compiled together with the remainder of the source code to generate the intermediate level representation. In some other implementations, the HLIL compiler 404 is configured to temporarily ignore or set aside various aspects of the safety data types and safety functions when compiling the source code. In some such implementations, the HLIL compiler 404 is configured to compile the source code as if these safety data types and safety functions were non-safety-critical versions (for example, standard versions) of themselves. In some such implementations, the safety features corresponding to the safety data types and safety functions can be integrated with the other portions of the compiled source code at the intermediate representation level. As an example, after compiling the high level source code of a circuit design that includes safety-critical variables or functions into an intermediate level representation (such as in HDL), the HLIL compiler 404 can integrate previously verified intermediate level code (e.g., HDL) for implementing the safety features into other portions of the compiled HDL circuit design. Furthermore, the HLIL compiler 404 can be configured to compile the source code such that the source code simulation/emulation performance is not affected by the inclusion of the safety data types, safety functions or other safety triggers. In some other implementations, the safety features can be implemented and integrated with the other portions of the compiled source code using other intermediate representation languages or formats. In yet other implementations, the safety features can be implemented and integrated with the other portions of the compiled source code at lower levels of abstraction, such as in a gate-level netlist format.

In some implementations, safety-critical functions constructed by a circuit developer also can be specified using safety data types. For example, a safety version of the function above can be constructed by specifying the return type of the function as a safety data type as shown below:

safe_float MyFunction(a, b)

As another example, a safety version of the function can be constructed by additionally or alternatively declaring the parameters of the function using safety data types either earlier in the source code or in the function prototype as shown below:

safe_float MyFunction(safe_int a, safe_float b)

As another example, a safety version of a standard function can be defined by the provider of the HLS tool 400 and stored in a header file 406. For example, a multiplication function getProduct defined in a header file 406 also can have a safety counterpart safe_getProduct in the same or a different header file 406.

Additionally or alternatively, a safety-critical function can be marked or otherwise identified in the source code for a circuit design using a special pragma directive (or simply "pragma"). The special pragma is a source code comment that is ignored by standard compilers, but recognized by the HLIL compiler 404 and interpreted as some kind of control. For example, a safety pragma (for example, #safe_function) can be inserted by the programmer ahead of a function call. As another example, a safety pragma can be entered on a command line preceding a definition of a safety-critical function. As described above, the special pragmas would be ignored by standard compilers, but recognized by the HLIL compiler 404 as marking the subsequently identified or defined function as a safety-critical function. Using this approach, the source code for the circuit design can be input to a standard compiler (such as a C-based compiler) without requiring modification of the standard compiler or removal of the safety-critical portions. This enables the designer to program and test various portions of the circuit design on other systems using standard compilers. The high level circuit design can be input to the HLS tool 400 for compiling by the HLIL compiler 404 when the circuit design is ready for the next stage of the design flow, for example, conversion into an intermediate representation level for integration with other components of a grander circuit design or for additional analysis, validation or verification.

As described above, when compiling the source code, the HLIL compiler 404 is able to recognize the safety data types and safety functions defined in the included header files 406 as well as to recognize other safety triggers or identifiers such as special safety pragmas. Based on the recognition of predefined safety data types, safety functions or safety pragmas, the HLIL compiler 404 can integrate various safety features in the intermediate level representation of the circuit design while or after compiling the source code. In some implementations, different safety data types and different safety functions can be associated with different safety features. Which safety features are included with which safety data types and safety functions can be defined in the associated header files 406 or defined in the operational code of the HLIL compiler 404 itself. For example, different safety data types and safety functions can be associated with different levels of safety-criticality or sensitivity, and thus, different safety features. Such safety features can include error detection and error correction techniques such as forward error checking (FEC) mechanisms. Such FEC mechanisms can in turn include, for example, error-correcting code (ECC), the use of parity bits, redundancy, or other techniques for improving the robustness of the design. Such safety features can be used to detect, correct for, or otherwise prevent or reduce the effects of or the number of errors that can result from, for example, improperly managed noise and timing margins, parasitic inductances and capacitances, or inadequately filtered supply signals or data signals.

For example, ECC codes can be included with sensitive safety-critical data. As another example, safety-critical data can be stored in special memory locations such as in embedded memory, and in some instances, in non-volatile memory as opposed to volatile memory. As one specific example, consider an engine throttle position variable specified in the source code using a safety data type. In some implementations, the HLIL compiler 404 generates an intermediate level representation of a safety feature that is synthesizable into logic configured to implement ECC protection. Alternatively, the HLIL compiler 404 can generate an intermediate level representation synthesizable into logic configured to store two copies of the value of the variable (for example, one in on-chip memory and one in off-chip memory), and to compare the two copies of the value when performing an operation or making a decision based on that variable. In some such instances, the value stored in the on-chip memory can be used only when it matches that in the off-chip memory. Alternatively, the HLIL compiler 404 can generate an intermediate level representation synthesizable to create two redundant logic blocks, for example, each performing the same calculation or other duplicative process to obtain the value of the variable. When performing an operation or making a decision based on that variable, the results obtained from each of the redundant logic blocks can be compared and the value of the results only used when the results match.

Advantageously, because the HLIL compiler 404 can be configured to generate such safety features based on the identification of safety data types, safety functions or other triggers or flags indicating safety-critical elements of a circuit design, a designer need not directly design and code such safety features in the source code. In some instances, the designer need only have nominal knowledge of the safety data types, safety functions, safety pragmas or other safety feature triggers or identifiers made available via the HLS tool 400 such that he can declare, define or otherwise mark or identify particular variables or functions as safety-critical elements of the circuit design in the source code. Indeed, the designer need not be proficient in implementing or even understanding the operations of the safety features at the high level synthesis level (the source code level), the intermediate representation level (for example, the HDL/RTL level), or a lower level (for example, the gate level or the physical device level). However, it can generally be desirable for the designer to have some knowledge of what safety features are afforded based on each of the safety data types, safety functions or other safety triggers or flags so that suitable, sufficient and relevant safety features are implemented while in some instances also bearing in mind considerations of complexity, efficiency, power consumption and timing constraints.

Figure 5:
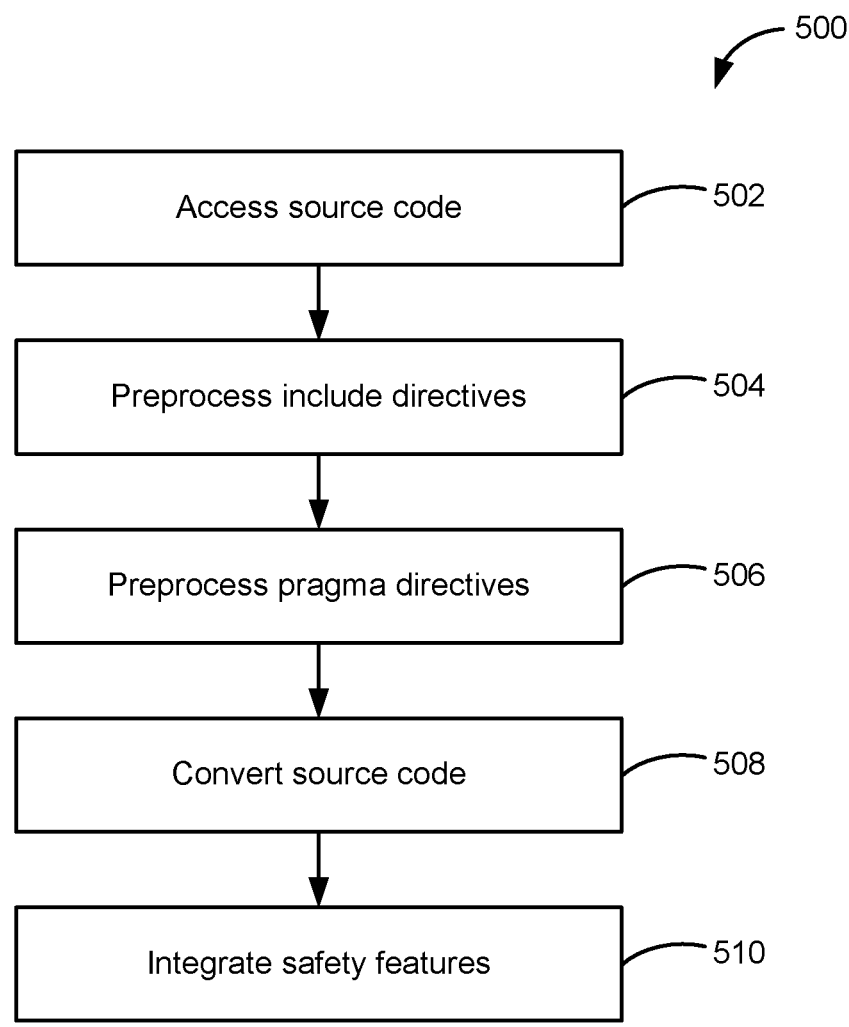
FIG. 5 shows a flowchart illustrating an example process for compiling a high level representation of a circuit design to generate an intermediate level representation of the circuit design.

FIG. 5 shows a flowchart illustrating an example process 500 for compiling a high level representation of a circuit design to generate an intermediate level representation of the circuit design. For example, the process 500 can be performed by the HLIL compiler 404 described with reference to FIG. 4. In some implementations or applications, the process 500 can be performed by the HLIL compiler 404 to compile high level source code specified in an OpenCL-compatible language, SystemC, C, C++, or another C-based programming language. In some other implementations or applications, the process 500 can be performed by the HLIL compiler 404 to compile high level source code specified in a non-C-based high level programming language. The process 500 can be performed by the HLIL compiler 404 to compile the high level source code into an intermediate level representation specified in, for example, Verilog, VHDL, AHDL or another HDL (or generally at a RTL level of abstraction). In some other implementations or applications, the high level source code can be compiled into a different intermediate representation such as a lower level C-based language representation or an intermediate representation based on the LLVM intermediate form (IF) (developed by the LLVM Developer Group).

In some implementations, the process 500 begins in block 502 with accessing the source code. The process 500 continues in block 504 with preprocessing various directives such as any include directives in the source code. Preprocessing the include directives in block 504 can generally include identifying the one or more include directives, identifying the one or more associated header files, accessing the one or more identified header files, retrieving the contents of the one or more accessed header files, and including the contents of the one or more retrieved header files in the source code in place of the associated include directives. Any macros in the source code also can be expanded in block 504. In some implementations, the process 500 continues in block 506 with preprocessing any special pragma directives in the source code. For example, preprocessing the pragma directives can include marking the subsequently identified or defined functions or function calls in the source code as safety critical.

In block 508, the process 500 continues with converting the source code into the target intermediate level representation form. For example, block 508 can include converting the source code based on the declarations and definitions included in the contents retrieved from the header files. Block 508 also can include converting the source code based on special safety pragmas or other indicators. In some implementations, the conversion in block 508 includes identifying at least one safety-critical variable declared, defined or otherwise identified with a safety data type. The conversion in block 508 also can include accessing a safety data type definition associated with the safety data type. In some implementations, the conversion in block 508 can additionally or alternatively include identifying at least one safety-critical function declared, defined or otherwise identified as safety critical.

In some implementations, the safety-critical variables and safety-critical functions are compiled together with the remainder of the source code in block 508 to generate the intermediate level representation. In some other implementations, the HLIL compiler 404 is configured to temporarily ignore or set aside various aspects of the safety data types and safety functions when compiling the source code. In some such implementations, the HLIL compiler 404 is configured to compile the source code as if these safety data types and safety functions were non-safety-critical versions (for example, standard versions) of themselves. In some such implementations, the process 500 can additionally include a block 510 for integrating the safety features corresponding to the safety data types and safety functions with the other portions of the compiled source code at the intermediate representation level. In some implementations, the resultant intermediate representation generated by the HLIL compiler 404 after converting the source code in block 508, and in some instances also after integrating safety features for safety-critical elements of the circuit design in block 510, is a data-flow-based representation (such as at the RTL level of abstraction). As an example, after compiling the high level source code of a circuit design that includes safety-critical variables or functions into an intermediate level representation (such as in HDL), the HLIL compiler 404 can integrate previously verified intermediate level code (e.g., HDL) for implementing the safety features into other portions of the compiled HDL circuit design. In some other implementations, the safety features can be implemented and integrated with the other portions of the compiled source code using other intermediate representation languages or formats.

Figure 6:
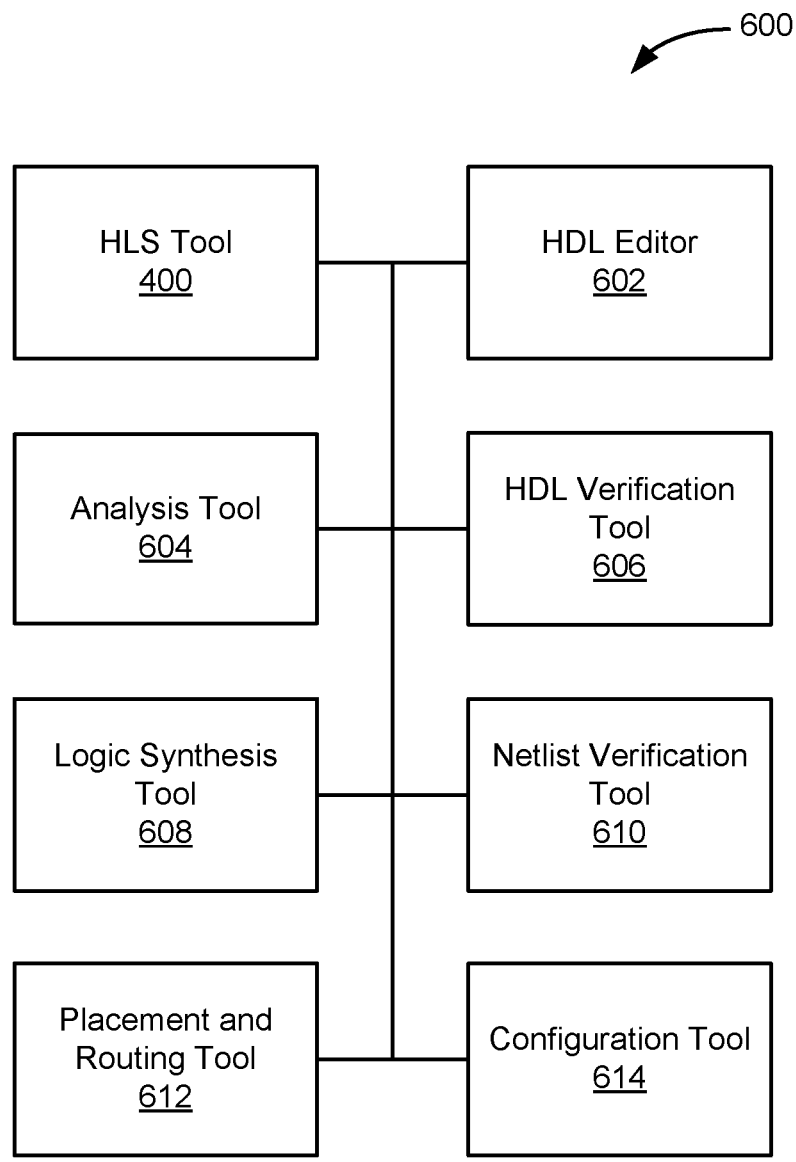
FIG. 6 shows a block diagram of an example integrated design tool package.

In some implementations, the HLS tool 400 is bundled or packaged with one or more other tools as an integrated tool or suite of tools that includes functionality for implementing one, some or all stages of a circuit design development project. For example, the other tools packaged with the HLS tool 400 can include various computer-aided design (CAD) tools and electronic design automation (EDA) tools for completing particular stages of the circuit design development project. FIG. 6 shows a block diagram of an integrated design tool package 600. The design tool 600 includes a number of tools or sub-tools in addition to the HLS tool 400 described above.

For example, the design tool 600 also can include an HDL editor 602 to input additional HDL expressions or to integrate the HDL representation generated by the HLS tool 400 with various I/O interfaces or other peripherals as well as other circuit designs in the form of HDL representations of IP blocks or entire IP cores. Advantageously, when a circuit design is converted into HDL, it is more easily connected or otherwise integrated with the rest of a top-level design.

The design tool 600 can additionally include an analysis tool 604 to analyze the integrated HDL design, an HDL verification tool 606 to verify the analyzed HDL design, a logic synthesis tool 608 to synthesize the HDL design into a lower level representations such as in the form of a gate level netlist, a netlist verification tool 610 to verify the gate level netlist, a placement and routing tool 612 to perform placement and routing of the synthesized gate level netlist, and in some implementations, a configuration tool 614 to generate configuration settings for a target PLD based on the placement and routing. In some non-PLD implementations, the configuration tool 614 can generate a physical design layout, for example, in the form of a GDSII file, for use by a fabrication facility in fabricating the circuit in a semiconductor die.

However, there is no requirement that any of the tools described herein be bundled into one package. Indeed, in some implementations, the HLS tools disclosed herein can be provided as standalone tools. In such latter implementations, the HLS tool can be stored in and execute within the same or a different computer system than the various other tools. In some implementations in which each of one or more of the functionalities just described are implemented as separate tools within the same system 600, an interface between the tools can be a database file, a log, or simply messages transmitted between the tools.

Figure 7:
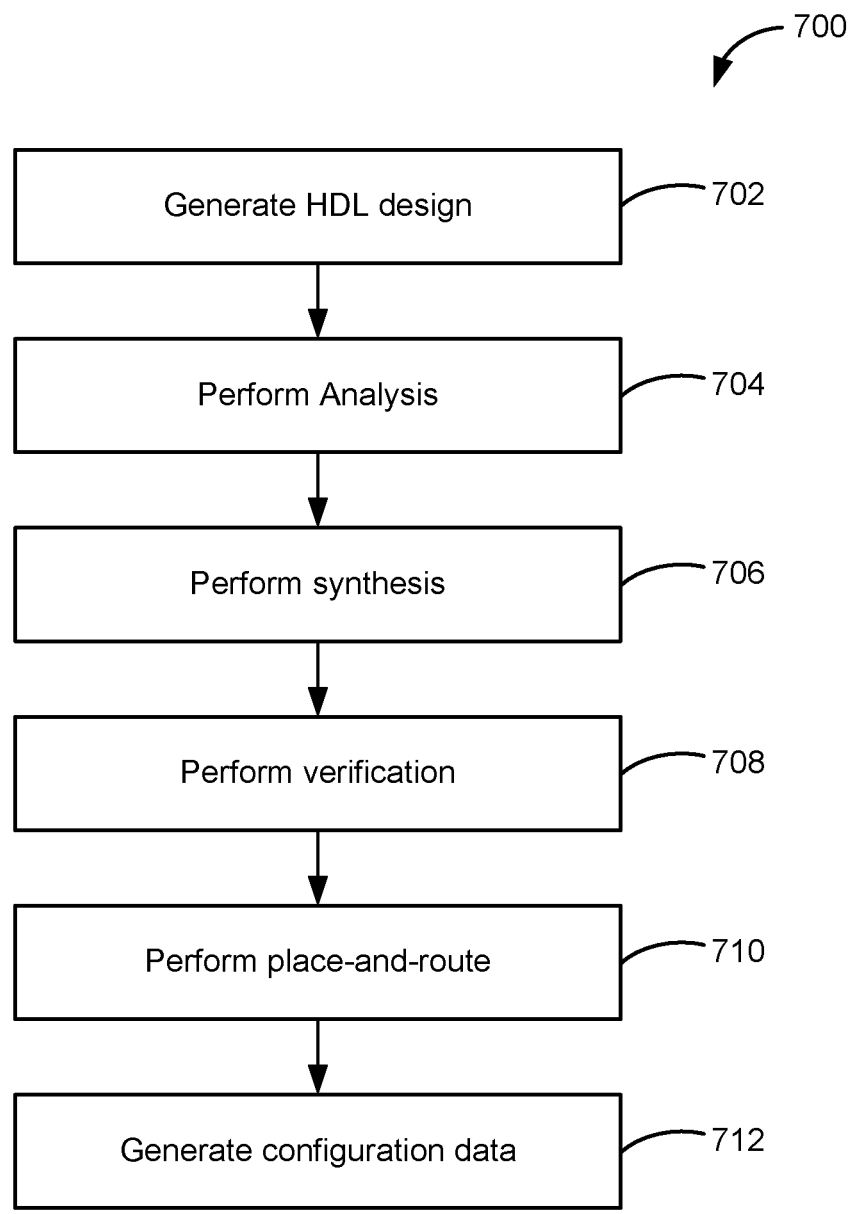
FIG. 7 shows a flowchart illustrating an example process for generating a low level representation of a circuit design from an intermediate level representation of the circuit design.

FIG. 7 shows a flowchart illustrating an example process 700 for generating a low level representation of a circuit design from an intermediate level representation of the circuit design. For example, in some implementations the process 700 can be performed by the design tool 600 described with reference to FIG. 6 to convert the HDL representation of the circuit design generated by the HLS tool 400 via the process 500 to a gate level netlist or to still lower levels of abstraction all the way to the physical device level. In some implementations, the process 700 begins in block 702 with generating an HDL design. As described above, block 702 can include the process 500 or can begin after the process 500 has completed. In either case, in block 702 the HDL representation of the circuit design generated by the HLS tool 400 via the process 500 can be integrated with I/O interfaces, other peripherals, IP blocks or entire IP cores from a library or database of such IP blocks or cores stored within the system in which the design tool 600 is executing. The process continues in block 704 with analyzing (for example, performing a code review or auditing of) the HDL-implemented design in preparation for synthesis. During the analysis, the HDL-implemented design is subject to a variety of error checking operations to aid in resolving errors before the HDL-implemented design is synthesized. In some implementations, the HDL editor 602 also can generate a hierarchical representation of the design based on the analysis that includes modules and calls between modules useful for testing and for integrating designs.

The process 700 continues in block 706 with synthesizing the HDL-implemented design. For example, the result of the synthesis can be a design implementation in terms of, for example, logic circuits and logic gates. In some instances, the result of the synthesis is a physically-realizable gate level netlist. A netlist generally includes a Boolean-algebra representation of the functions of the design implemented as logic gates or process-specific standard cells. In contrast to an HDL-implemented design representation, which can be used to express structural, behavioral, or RTL architectures that include temporal characteristics, a netlist representation generally expresses only the circuit connectivity between a hierarchy of blocks or logic elements.

In some implementations, the process 700 continues in block 708 with verifying the synthesized design. In some implementations, a place-and-route operation is then performed on the synthesized and verified design in block 710. The place-and-route operation uses knowledge of the target architecture to determine connections between the inputs and outputs of the various logic elements in accordance with the logic and security required to implement the design. The user can then validate the place-and-route results via timing analysis, simulation, and other verification methodologies. In some instances, the user may cause the programming engine to perform a verification operation after the place-and-route operation in addition to, or in lieu of, the verification operation in block 708.

In PLD implementations, the process 700 can continue in block 712 with the performance of a programmable logic configuration operation using the output of the place-and-route operation to generate configuration data for the target PLD. The output of the programmable logic configuration operation is typically a programming file (also referred to herein as a "configuration data file") that includes the configuration settings in the form of programming bits (also referred to herein as a "configuration data") for the target PLD. In some implementations, the timing, power, or other requirements of the PLD design can then be verified again, this time using the programming bits. For example, the programming bits can then be programmed into an actual PLD that is then subjected to verification or certification. Again, in some non-PLD implementations, the configuration operation can generate a physical design layout, for example, in the form of a GDSII file, for use by a fabrication facility in fabricating the circuit in a semiconductor die.

Figure 8:
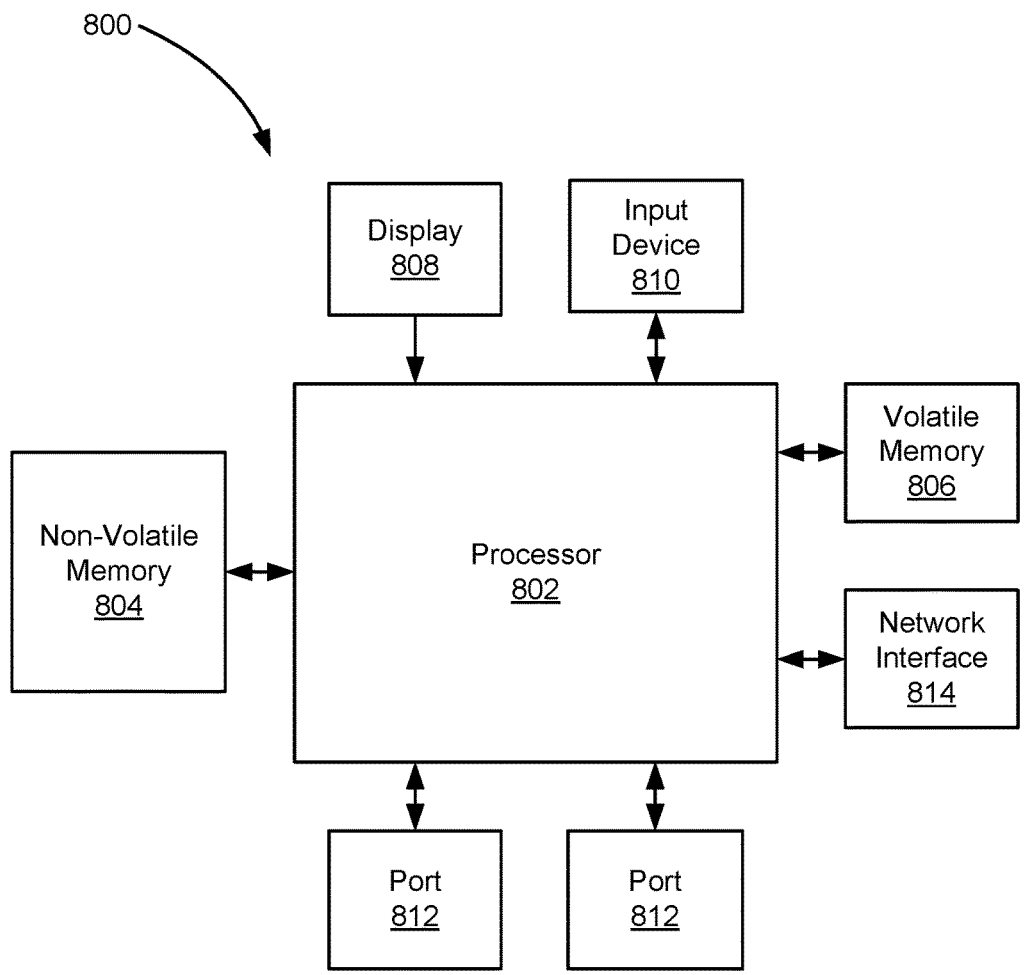
FIG. 8 shows a block diagram of example components of a system configurable to generate a circuit design.

FIG. 8 shows a block diagram of example components of a system 800 configurable to generate a circuit design. The system 800 can generally be or can include any suitable computer, computer system or computing device (used interchangeably herein) that can be programmed to execute the HLS tool 400 and in some instances, the other tools described with reference to the design tool of FIG. 6. For example, the system 800 can be or can include a workstation, a desktop computer (for example, a personal computer (PC)), a laptop computer or a tablet computer, among other suitable computing devices.

The system 800 generally includes at least one processor or processing unit 802 (hereinafter used interchangeably) such as a single core or multicore central processing unit (CPU). The system 800 also includes at least one non-volatile memory device 804, such as a magnetic, optical or solid state hard drive, and at least one volatile memory device 806, such as random access memory (RAM), dynamic RAM (DRAM), or double data rate synchronous DRAM (DDR SDRAM) (including third generation DDR3, fourth generation DDR4 or other generations). The system also includes a display 808 and one or more user input devices 810. The user input devices 810 can include or work in conjunction with the display 808 as a touchscreen interface. Additionally or alternatively, the user input devices 810 can include one or more of a computer mouse, a keyboard, a trackball, a touchpad or other user input device. The system 800 also generally includes one or more ports 812 for connecting the system 800 with external devices. One example of an external device that can be connected with the system 800 is a download cable (described above with reference to FIG. 2). Another example of an external device that can be connected with the system 800 is an external memory device. For example, such an external memory device can be or can include a flash drive, also referred to as a "thumbdrive," such as a memory stick (MS), MultiMediaCard (MMC), Secure Digital card (SD), SmartMedia card (SM), Universal Serial Bus (USB) flash drive (UFD), solid-state drive (SSD), or other portable or removable memory device or hard drive. For example, the ports 112 can include one or more USB ports or one or more Ethernet ports for connecting with such external devices. The system 800 also can include one or more network interfaces 814 including one or more wireless network interfaces (for example, a Wi-Fi interface, a Near Field Communication (NFC) interface, or a Bluetooth interface) or one or more wired network interfaces (for example, a Local Area Network (LAN) interface or a Wide Area Network (WAN) interface). In some implementations, the wired network interface can include one or more of the ports 812, such as an Ethernet port.

Generally, the non-volatile memory 804 is a computer-readable medium that can store non-transitory processor-executable instructions (also referred to herein as "code"), which when executed by the processor 802, cause various operations to be performed by or in conjunction with the processor 102. For example, the non-volatile memory device 804 typically stores code for implementing an operating system ("OS") such as, for example, a Linux® kernel-based operating system, a UNIX®- or Unix-like-based operating system, a Microsoft Windows®-based operating system, or another suitable operating system. The non-volatile memory device 804 also can store code for implementing a number of software programs including associated device drivers including the HLS tool 400 described above, and in some instances, one or more of the other tools described with reference to the design tool 600 of FIG. 6.

In some implementations, the non-volatile memory 804 also can store a library or database of previously generated logic, functions, circuits or entire intellectual property (IP) blocks, macros or cores. For example, to simplify or accelerate the design process, especially for the production of complex circuit designs, existing libraries of predefined complex functions and circuits that have already been tested and optimized can be stored in the non-volatile memory 804. Such IP cores can be previously created by the designer or by other designers within a business organization and recycled in subsequent designs. IP cores also can be licensed from and otherwise made available by third parties such as various PLD vendors, third-party IP suppliers or developer communities. IP cores can be broadly categorized as "hard" IP cores or "soft" IP cores depending on the manifestation of the design as licensed, provided or otherwise made available to the subsequent designer desiring to include the IP core within his grander design. A soft IP core is typically provided as a synthesizable RTL representation, such as in the form of a hardware description language (HDL) specification. When provided in RTL form, a designer can modify the design at the functional level. Soft IP cores also can be provided as gate level netlists. Gate level netlists are harder to reverse engineer, and thus, provide the soft IP core provider with more protection, but may be harder to integrate with other portions of a design. Both RTL and netlist-level representations can be used to implement both configurable logic or non-configurable hardwired logic.

The volatile memory 806 is a computer-readable medium that can temporarily store data retrieved from the non-volatile memory 804 as well as data input by the programmer, data retrieved from another memory device (such as a portable or pluggable external memory device) or data calculated or otherwise determined by the processor 802 while performing various operations (including blocks in the process 500 and the process 700).

Although many of the components and processes are described above in the singular form for convenience, it will be appreciated by one having ordinary skill in the art that multiple components and repeated processes also can be used to practice the techniques presented in this disclosure. While particular innovative aspects have been particularly shown and described with reference to specific implementations thereof, it will be understood by those having ordinary skill in the art that changes in the form and details of the disclosed implementations may be made without departing from the spirit or scope of the innovative aspects described. For example, innovative aspects of the present disclosure may be employed with a variety of components and should not necessarily be restricted to the ones mentioned above. Additionally, certain steps or blocks in one or more of the processes described above may be omitted, performed multiple times, performed in parallel, and performed in different orders. It is therefore intended that the disclosed implementations be interpreted to include all variations and equivalents that fall within the true spirit and scope of the innovative aspects described.

What is claimed is:

1. A tangible, non-transitory, and computer-readable medium storing instructions that, when executed by one or more processors, cause one or more processors to:
    identify at least one protection version of a data type of an algorithmic description representation of a circuit design, wherein the protection version includes at least one protection mechanism that is based at least in part on the protection version for the data type; identify at least one programming language construct associated with the protection version of the data type, wherein the algorithmic description representation is specified in a first language; and
    generate a second representation of the circuit design based on the algorithmic description representation and a definition for the protection version of the data type, wherein the second representation is specified in a second language and includes at least one protection mechanism that is based at least in part on the protection version of the data type wherein the second representation is used to configure a manufactured programmable logic device after manufacturing of the programmable logic device has been completed.

2. The tangible, non-transitory, and computer-readable medium of claim 1, wherein the algorithmic description representation comprises a control-flow-based representation and wherein the second representation is a data-flow-based representation.

3. The tangible, non-transitory, and computer-readable medium of claim 2, wherein the second language comprises a hardware description language.

4. The tangible, non-transitory, and computer-readable medium of claim 1, wherein the first language comprises a high-level synthesis programming language.

5. The tangible, non-transitory, and computer-readable medium of claim 2, wherein the second representation of the circuit design is a register-transfer level (RTL) representation.

6. The tangible, non-transitory, and computer-readable medium of claim 1, wherein the algorithmic description representation includes one or more directives identifying one or more header files, the one or more header files defining one or more safety data types including the protection version of the data type.

7. The tangible, non-transitory, and computer-readable medium of claim 1, wherein the protection version of the data type specifies a protected function to use the at least one protection mechanism.

8. The tangible, non-transitory, and computer-readable medium of claim 7, wherein the protected function comprises a protection version of a standard function.

9. The tangible, non-transitory, and computer-readable medium of claim 1, wherein the at least one programming construct comprises at least one parameter defined using the protection version of the data type.

10. The tangible, non-transitory, and computer-readable medium of claim 1, wherein the at least one programming language construct comprises at least one pragma directive identifying a function as a protection version a function that is compiled differently than a standard version of the function.

11. The tangible, non-transitory, and computer-readable medium of claim 1, wherein the first language is compatible with a standardized framework for programs that execute across multiple heterogeneous platforms.

12. The tangible, non-transitory, and computer-readable medium of claim 1, wherein the at least one programming language construct incudes at least one function having a return type defined using the protection version of the data type.

13. A system comprising:
one or more memory devices storing instructions;
one or more processing devices configured to execute the instructions to cause the one or more processing devices to:
identify at least one protection version of a data type of an algorithmic description representation of a circuit design, wherein the protection version includes at least one protection mechanism that is based at least in part on the protection version for the data type;
identify at least one programming language construct associated with the protection version of the data type, wherein the algorithmic description representation is specified in a first language; and
generate a second representation of the circuit design based on the algorithmic description representation and a definition for the protection version of the data type, wherein the second representation is specified in a second language and includes at least one protection mechanism that is based at least in part on the protection version of the data type, wherein the second representation is used to configure a manufactured programmable logic device after manufacturing of the programmable logic device has been completed.

14. The system of claim 13, wherein the algorithmic description representation comprises one or more directives identifying one or more header files, the one or more header files define one or more protection versions of data types including the protection version of the data type.

15. The system of claim 14, wherein the instructions cause the one or more processing devices to:
identify the one or more directives;
identify the one or more header files;
access the one or more header files;
retrieve the contents of the one or more header files; and
include the contents of the one or more header files in the algorithmic description representation prior to generating the second representation.

16. The system of claim 13, wherein the at least one programming language construct comprises at least one function including at least one parameter defined using the protection version of the data type.

17. The system of claim 13, wherein the at least one construct includes at least one pragma directive identifying a function as a protected function.

18. A method comprising:
identifying at least one protection version of a data type of an algorithmic description representation of a circuit design, wherein the protection version includes at least one protection mechanism that is based at least in part on the protection version for the data type;
identifying at least one programing language construct associated with the protection version of the data type, wherein the algorithmic description representation is specified in a first language; and
generating a second representation of the circuit design based on the algorithmic description representation and a definition for the protection version of the data type, wherein the second representation is specified in a second language and includes at least one protection mechanism that is based at least in part on the protection version of the data type, wherein the second representation is used to configure a manufactured programmable logic device after manufacturing of the programmable logic device has been completed.

19. The method of claim 18, wherein the algorithmic description representation is a control-flow-based representation and wherein the second representation is a data-flow-based representation.

20. The method of claim 19, wherein the first language comprises a high-level synthesis programming language, and the second representation is a data-flow-based representation.

* * * * *